Figure 1:
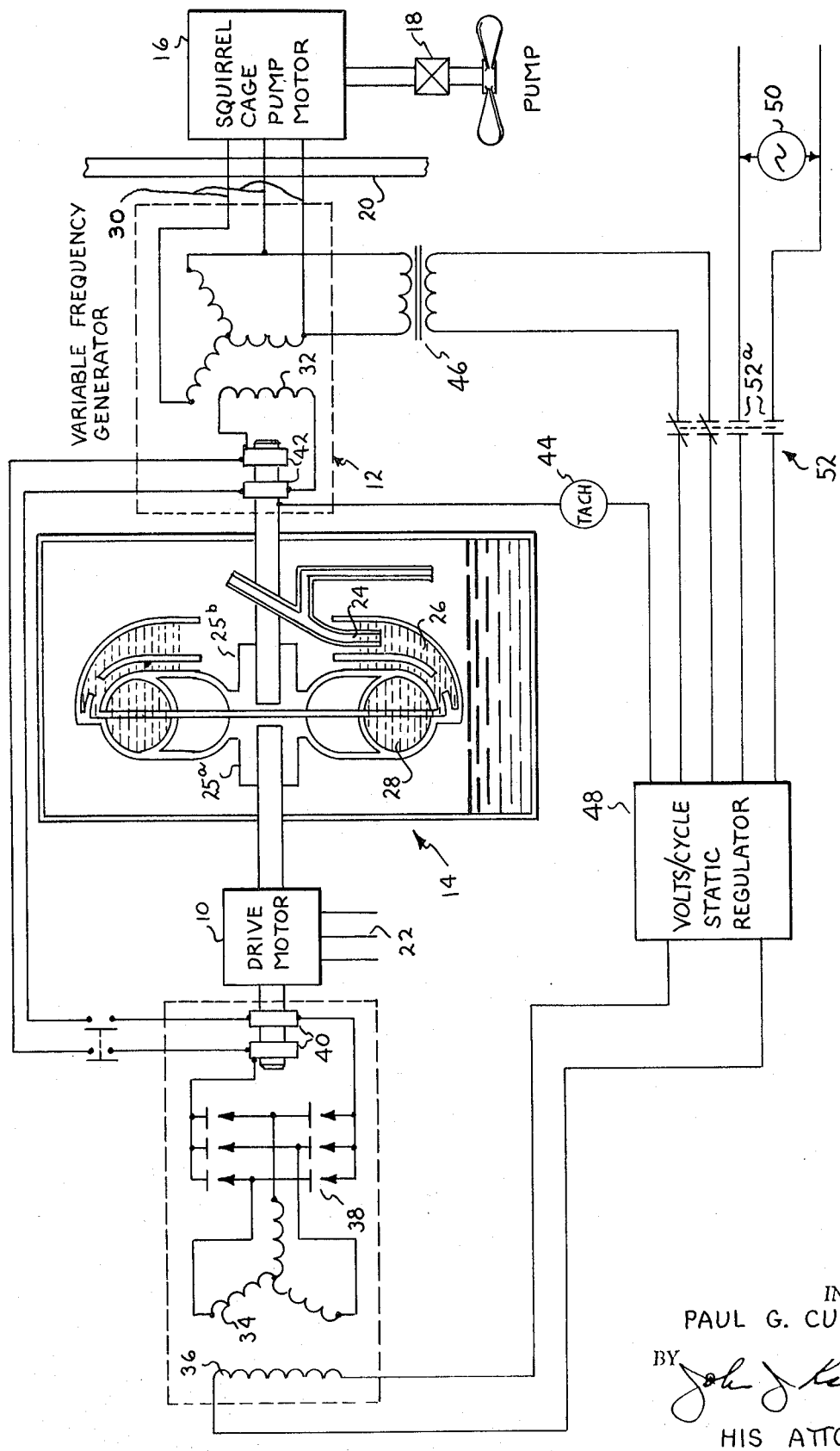

United States Patent

Cummings

[15] 3,686,550

[45] Aug. 22, 1972

[54] METHOD AND APPARATUS FOR STARTING A LARGE INERTIA DYNAMOELECTRIC MACHINE

[72] Inventor: Paul Gene Cummings, Schenectady, N.Y.

[73] Assignee: General Electric Company

[22] Filed: Dec. 17, 1970

[21] Appl. No.: 99,088

[52] U.S. Cl............................318/148, 318/157
[51] Int. Cl..............................H02p 9/06
[58] Field of Search.................318/11–13, 104, 318/147, 148, 157, 158

[56] References Cited

UNITED STATES PATENTS

| | | | |
|---|---|---|---|
| 2,895,096 | 7/1959 | Wallace | 318/148 X |
| 3,265,947 | 8/1966 | Woehler | 318/148 X |

Primary Examiner—Bernard A. Gilheany
Assistant Examiner—W. E. Duncanson, Jr.
Attorney—John J. Kissane, James C. Davis, Jr., Frank L. Neuhauser, Oscar B. Waddell and Joseph B. Forman

[57] ABSTRACT

A 9,000 horsepower squirrel cage pump motor is started utilizing a variable frequency generator driven by a constant speed drive motor through an adjustable speed transmission. During the starting procedure, the generator initially is run without an applied field at a speed of approximately 50 percent rated speed whereupon voltage is applied to the generator field winding. The generator then picks up load thereby reducing the generator speed to a level at which the generator output exceeds the required break-away power of the pump motor, i.e., between 5 and 25 percent of rated generator speed. The speed of the generator and pump motor then increases to a value determined by the adjustable speed fluid transmission setting whereupon the speed of the generator and pump motor is increased to the desired operational level by increasing the coupling in the fluid drive.

9 Claims, 2 Drawing Figures

INVENTOR.
PAUL G. CUMMINGS
BY John J. Kissane
HIS ATTORNEY

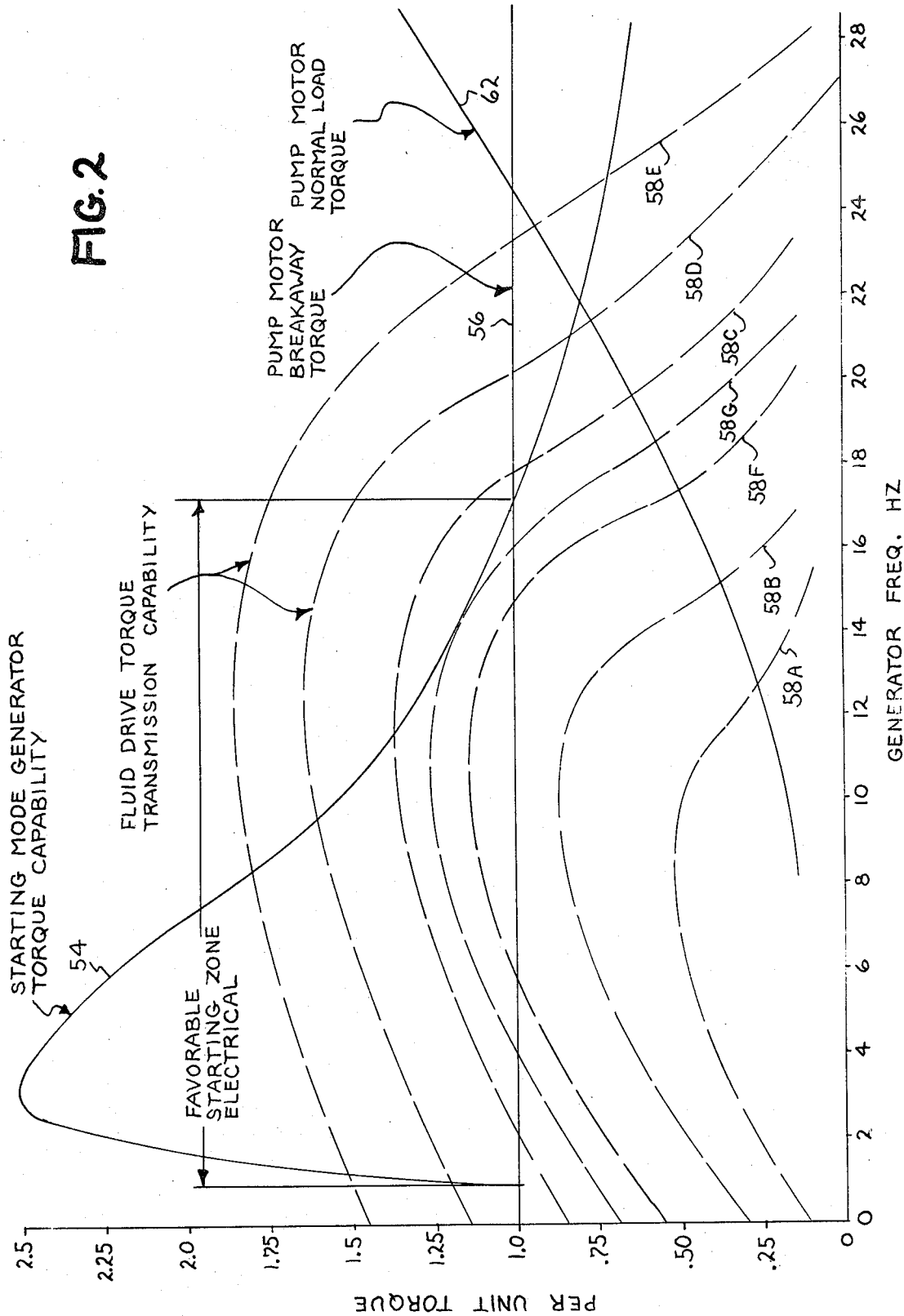

METHOD AND APPARATUS FOR STARTING A LARGE INERTIA DYNAMOELECTRIC MACHINE

This invention generally is directed to a method and apparatus for starting large inertia dynamoelectric machines. More particularly, the invention relates to a technique for starting large horsepower motors utilizing a variable frequency generator driven by a constant speed source through an adjustable speed transmission.

For any given setting of the control rods in a boiling water reactor, the power generated by the reactor generally varies as a function of the water circulation rate within the reactor. Because of this relationship, control of the power output of boiling water reactors can be regulated by the relatively simple technique of varying the operational speed of the water recirculation pump situated within the containment vessel of the reactor. Adjustable speed drive for the recirculation pump, however, has presented a formidable problem.

Among techniques customarily employed for speed regulation of large inertia loads is a drive motor directly coupled to the load through a speed regulating unit such as a fluid transmission. Because the recirculation pump is situated within the containment vessel, however, such direct drive technique can result in water and/or radiation leakage through the orifice permitting entry of the drive shaft into the containment vessel. Moreover, utilization of a vertically disposed drive for the recirculation pump to conserve space within the containment vessel is inhibited by the required horizontal disposition of the fluid transmission.

Some large inertia motors heretofore also have been started by application of voltage at reduced frequency to the motor windings utilizing an adjustable frequency generator driven by a speed regulated D.C. motor. As the motor locks into synchronism with the low frequency voltage source, the energizing frequency is raised to bring the motor up to rated speed. This low frequency starting technique, however, becomes impractical for large loads requiring a high speed drive, for example, a 1,200 rpm, 6,000 Hp drive motor. Moreover, excitation of the variable frequency source becomes expensive when the exciter for the generator is mechanically coupled to the drive shaft of the variable frequency source because of the reduced capability of the exciter at reduced speeds.

It is therefore an object of this invention to provide a novel method of starting a large inertia load (i.e., a load with associated large break-away power requirements) utilizing a variable frequency generator driven through an adjustable speed transmission.

It is also an object of this invention to provide a method of starting a large inertia load utilizing a variable frequency generator wherein generator excitation is independent of generator speed.

It is a further object of this invention to provide a method of starting a large inertia load utilizing a constant speed drive, a fluid transmission and variable frequency generator having an exciter of reduced speed.

It is a still further object of this invention to provide a novel combination of dynamoelectric machines whereby a large inertia motor can be started utilizing a minimum sized variable frequency generator driven by a constant speed source through a fluid transmission.

These and other object of this invention generally are achieved by energizing the large inertia motor with the output from an adjustable frequency generator driven in a novel fashion to assure starting of the motor. The adjustable frequency generator initially is driven by the constant speed drive through an adjustable speed transmission, e.g., a fluid transmission, to rotate the generator at a predetermined speed both substantially below the rated generator speed and in excess of the speed range in which the generator is capable of causing the pump motor to break away i.e., a predetermined speed typically between 35 and 70 percent of rated speed. Excitation Excitation then is applied to the generator field winding to energize the large inertia motor whereupon the speed of the generator is reduced by the applied load to the break-away frequency of the large inertia motor, e.g., a frequency between 5 and 20 percent of rated generator frequency. After the speed of the generator increases to the speed determined by the fluid transmission, the generator and motor can be brought up to a desired operational speed on breakdown torque at minimal slip, thereby minimizing heating of the generator and motor windings.

Although the invention is described with particularity in the appended claims, a more complete understanding of the basic principles of the invention can be obtained from the following detailed description taken in conjunction with the appended drawings, wherein:

FIG. 1 is a schematic illustration depicting in block diagram form a pump motor starting unit in accordance with this invention, and, FIG. 2 is a graphical illustration showing the relationship between the electrical and hydraulic characteristics of the adjustable frequency generator and the fluid transmission, respectively, illustrated in FIG. 1.

Referring more particularly to FIG. 1, apparatus for starting a large inertia load in accordance with this invention generally comprises a drive motor 10 mechanically coupled to a variable frequency generator 12 through an adjustable speed fluid transmission 14 to produce an output signal having a frequency dependent upon the coupling between the induction motor and the generator. The output of generator 12 is employed to start and control the speed of squirrel cage induction motor 16 situated within the boiling water reactor containment vessel for driving pump 18 circulating coolant through the reactor. Because only static electrical connections need be passed through wall 20 of the containment vessel, a tight seal can be achieved at the entry orifice minimizing any danger of radiation leakage.

Drive Motor 10 can be a conventional squirrel cage induction motor capable of starting with an across-the-line excitation applied to leads 22 and typically may be a six-pole, 9,000 Hp, three-phase motor having a speed of 1,185 rpm at rated load. To permit direct coupling of the motor shaft to fluid transmission 14, the drive motor is horizontally disposed notwithstanding the space saving advantages generally associated with vertical mounting.

Fluid transmission 14 is any commercially available fluid transmission such as fluid drive unit 497–5H–SP sold by AMERICAN STANDARD and illustrated in AMERICAN STANDARD Catalogue No. D–1100. Typically, these fluid transmissions have a scoop tube 24 to maintain the appropriate oil linkage between impeller 25A on the input shaft and runner 25B on the output shaft of the transmission to obtain desired output speed. Thus, for a given rotary speed of the transmission impeller, the fluid transmission exhibits diverse torque transmission characteristics (as will be explained more fully hereinafter) dependent upon the penetration of scoop tube 24 into oil well 26 and the amount of oil removed by the scoop tube from oil ring 28 communicating the impeller and runner of the transmission. Although a fluid transmission is preferred as the adjustable speed transmission coupling drive motor 10 to adjustable frequency generator 12, it should be appreciated that other adjustable speed transmissions having transmission characteristics comparable to a fluid transmission also are suitable for utilization in this invention. For example, the transmission could be a commercially available eddy current coupling unit wherein diverse transmission characteristics are obtained by varying eddy current flow in the transmission.

The output shaft from fluid transmission 14 is directly coupled to the shaft of variable frequency generator 12 to rotate the generator rotor at a speed determined by the fluid transmission setting. Typically, generator 12 may be a synchronous generator of conventional design producing a three-phase output signal at a frequency between 19 and 96 percent of the synchronous frequency of drive motor 10. The output signal from generator 12 is fed through conductors 30 to squirrel cage induction motor 16, i.e., typically a 4,000–8,000 Hp pump motor situated within the containment vessel of the boiling water reactor. Because the pump motor need not be positioned to accept mechanical torque through fluid transmission 14, motor 16 can be mounted vertically and preferably is of a design substantially identical to the motor disclosed in U.S. patent application Ser. No. 73,767 entitled "Vertical Induction Motor," filed Sept. 8, 1970, in the name of J.E. Tillma and assigned to the assignee of the present invention. Because the motor-generator set provides sufficient inertia to continue pumping of water through the boiling water reactor for a limited period after power failure, the flywheel illustrated in the pump motor of the Tillma application may be omitted from pump motors utilized in systems built in accordance with the teachings of this invention.

Excitation for generator 12 is provided by a field winding 32 mounted in conventional fashion on the rotor shaft of the generator. However, because the speed of the generator rotor is dependent upon the setting of the scoop tube within the fluid transmission 14, the exciter for generator 12 is not mounted on the shaft of the generator rotor but rather is mounted on the shaft of the drive motor 10 as illustrated by the three-phase windings 34 forming the rotating armature of the generator exciter. The exciter otherwise is conventional in design and includes a stationary field winding 36 wound on salient poles (not shown) fixedly mounted in a circumferentially encompassing attitude relative to the shaft mounted armature carrying windings 34. The alternating current generated within rotating windings 34 is rectified by silicon diode bridge 38 and fed to field winding 32 of generator 12 through slip rings 40 and 42 mounted on the rotor shafts of drive motor 10 and variable frequency generator 12, respectively.

Control of the generated output from exciter windings 34 is achieved during operation of pump 18 by measuring both the speed of generator 12 utilizing tachometer generator 44, e.g., a type BC–42 tachometer generator sold by the Specialty Motors Department of the General Electric Company, and the line-to-line voltage of generator 12 by means of transformer 46. The output signals from the tachometer generator and the transformer are fed to constant volts-per-cycle static regulator 48, e.g., volts-per-cycle regulator 3S7930SAA4 sold by the Specialty Control Department of the General Electric Company, to provide excitation for the exciter field winding 36 as required to maintain line voltage of generator 12 at the desired volts-per-cycle voltage. An auxiliary 120 volt AC supply 50 also is applied as in input to static regulator 48 to surge current, i.e., up to approximately 200 percent of rated current, through exciter field winding 36 during starting of motor 16. To provide a self-contained system which will continue to pump water for a limited period after power failure, auxiliary supply 50 is interlocked with the output from transformer 46 by means of contacts 52 to transfer the input to static regulator 48 from auxiliary supply 50 to transformer 46 when the line-to-line voltage of generator 12 reaches approximately 20 percent of rated voltage.

To start squirrel cage induction motor 16, the electrical characteristics of variable frequency generator 12 must be correlated with the hydraulic characteristics of fluid transmission 14. With maximum excitation applied to variable frequency generator 12, i.e., with auxiliary supply 50 applied to exciter field 36 and drive motor 10 running at rated speed, the variable frequency generator exhibits a starting torque capability characteristic illustrated by curve 54 of Fig. 2. Because a generator torque greater than the constant break-away torque required by pump motor 16 (illustrated by line 56) is required to jog the motor into starting, starting of motor 16 is attained only when starting torque capability curve 54 exceeds break-away torque line 56, i.e., at frequencies below approximately 17 Hz in the illustrated example. While it will be appreciated that the torque capability curve can be raised by providing ever increasing excitation for generator 12, maximum design efficiency is attained when the starting torque capability exceeds the break-away torque at frequencies between 5 and 25 percent of rated generator frequency with optimum starting torque generally being obtained at frequencies between approximately 6 and 15 percent of the rated generator frequency.

The electrical characteristics of generator 12, however, must be correlated with the torque transmission capability of fluid transmission 14 (i.e., the generator torque capability as limited by the fluid drive characteristics as a function of scoop tube location) to assure transmittal of torque from constant speed drive motor 10 to generator 12 in an amount exceeding that required for break-away of motor 16. For each setting of scoop tube 24 within fluid transmission 14, diverse hydraulic transmission characteristics are obtained from the fluid transmission as illustrated by torque transmission capability curves 58. Thus, if the scoop tube penetrates too deeply into oil well 26, fluid transmission 14 exhibits a torque transmission capability (illustrated by curves 58A and 58B) insufficient to provide break-away torque to motor 16. Penetration of the scoop tube too shallowly into the oil well, however, results in torque transmission capability curves, such as curves 58C, 58D and 58E, which intersect torque capability curve 54 at frequencies higher than the break-away frequency along the torque capability curve. These intersections between the torque capability curve and the torque transmission capability curves provide dwell regions for the system inhibiting the system from reaching the break-away torque required for starting motor 16. I have found, however, that reliable starting of motor 16 can be obtained by adjusting the penetration of scoop tube 24 within oil well 26 to those locations producing torque transmission capability curves, e.g., curves 58F and 58G, having a value in excess of the required break-away torque while being constantly below the starting torque capability characteristic until reaching break-away torque. Thus, only a limited scoop tube penetration zone, i.e., a zone producing a torque transmission capability in excess of the required break-away torque and below the starting torque capability curve (fixed by the excitation system of generator 12) until break-away torque is exceeded, is suitable for starting motor 16. Typically, the scoop tube penetration zone required to assure starting of motor 16 will produce a free-running speed, i.e., a speed without applied excitation to generator 12 of between approximately 35 and 70 percent of the rated generator speed. This speed range, however, is subject to increase or decrease depending upon the torque transmission capability curves of fluid transmission 14, the torque capability curves of generator 12 and the break-away torque of motor 16.

With scoop tube 24 inserted to a depth producing a torque transmission capability in fluid transmission 14 exemplified by, for example, curve 58G, unexcited generator 12 is driven at approximately one-half rated speed whereupon contacts 52A are closed to surge current from auxiliary supply 50 through exciter field winding 36. The current surge through field winding 36 induces current flow in rotating winding 34 exciting the field of generator 12 to load the generator. The load placed upon the generator is transmitted back to fluid transmission 14 and the generator speed drops along torque transmission capability curve 58G until the break-away torque of motor 16 is exceeded whereupon the speed of generator 12 increases along torque transmission capability curve 58G to the pump motor normal load torque curve 62 for the scoop tube setting. The generator speed then can be increased along curve 62 by varying the penetration of scoop tube 24 within the adjustable fluid drive to produce a desired operational speed for squirrel cage induction motor 16. Because motor 16 comes up to speed at minimum slip, heating in the motor windings is minimized.

What I claim as new and desired to protect by Letters Patent of the United States is:

1. A method of starting a large inertia dynamoelectric machine comprising providing a constant speed drive source, coupling said constant speed drive source to a variable frequency generator through an adjustable speed transmission unit to rotate said generator at a speed below rated speed and in excess of the running speed required for transmittal of break-away torque through said transmission unit, said generator rotational speed being between approximately 35 and 70 percent of rated speed, exciting the field windings of said generator to load said generator with said large inertia dynamoelectric machine, the speed of said generator being reduced upon loading to the break-away frequency of said large inertia dynamoelectric machine, and increasing the speed of said machine on breakdown torque to produce a desired operational speed.

2. A method of starting a large inertia dynamoelectric machine according to claim 1 wherein said transmission unit is a fluid drive unit.

3. A method of starting a large inertia dynamoelectric machine according to claim 2 wherein said generator speed is reduced upon loading to between 5 and 25 percent of the rated speed of said generator.

4. A method of controllably operating a large inertia dynamoelectric machine comprising starting the large inertia machine according to the method of claim 3 and further including sensing the speed and output voltage of said generator, generating a signal proportional to the volts-per-cycle of said generator and feeding said proportional signal to said field excitation to maintain a constant volts-per-cycle output from said generator during operation.

5. The combination comprising:
 a. a constant speed drive source,
 b. a variable frequency generator,
 c. adjustable speed transmission means for coupling said constant speed drive source to said variable frequency generator,
 d. a large inertia dynamoelectric machine,
 e. means for connecting the output signal generated by said variable frequency generator to said large inertia machine,
 f. means for exciting the field windings of said generator to produce an output signal therefrom having a frequency proportional to the rotational speed of said generator,
 g. means for initiating excitation of said generator field windings at a generator speed between approximately 35 and 70 percent of the rated generator speed, said generator speed decreasing upon excitation of said field winding to the break-away frequency of said large inertia machine, and
 h. means for increasing the speed of said large inertia machine on breakdown torque to produce a desired operational speed.

6. The combination of claim 5 wherein said constant speed drive means is an induction motor, said adjustable speed transmission means is a fluid drive unit, and said generator excitation means includes an exciter mechanically coupled to the shaft of said induction motor and rectifying means coupling said exciter to said generator field winding.

7. The combination of claim 6 wherein said generator excitation means includes means for surging current through said generator field winding in excess of the continuous current rating for said field windings, means for disconnecting said surge means from said generator field windings upon sensing of a predetermined voltage from said generator, means for generating an output signal proportional to the volts-per-cycle produced by said variable frequency generator and means for applying said volts-per-cycle signal to said generator field winding.

8. A method of starting a large inertia dynamoelectric machine according to claim 1 wherein said transmission eddy current coupling unit.

9. A method of starting a large inertia dynamoelectric machine according to claim 8 wherein said generator speed is reduced upon loading to between 5 and 25 percent of the rated speed of said generator.

* * * * *